(12) United States Patent
Glugla et al.

(10) Patent No.: US 11,359,566 B2
(45) Date of Patent: Jun. 14, 2022

(54) METHOD AND SYSTEM FOR ENGINE CONTROL

(71) Applicant: Ford Global Technologies, LLC, Dearborn, MI (US)

(72) Inventors: Chris Paul Glugla, Macomb, MI (US); Garlan J. Huberts, Milford, MI (US); Qiuping Qu, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 154 days.

(21) Appl. No.: 16/534,739

(22) Filed: Aug. 7, 2019

(65) Prior Publication Data

US 2021/0040905 A1 Feb. 11, 2021

(51) Int. Cl.
| F02D 41/02 | (2006.01) |
| F02D 41/12 | (2006.01) |
| F01N 11/00 | (2006.01) |
| F02D 41/00 | (2006.01) |

(52) U.S. Cl.
CPC ........ *F02D 41/0295* (2013.01); *F01N 11/005* (2013.01); *F01N 11/007* (2013.01); *F02D 41/0005* (2013.01); *F02D 41/0235* (2013.01); *F02D 41/123* (2013.01); *F02D 2041/0265* (2013.01); *F02D 2200/602* (2013.01)

(58) Field of Classification Search
CPC ............... F02D 41/0295; F02D 41/123; F02D 41/0005; F02D 41/0235; F02D 2041/0265; F02D 2200/602; F02D 41/0245; F02D 2200/0814; F02D 2200/70; F02D 2200/0802; F02D 2200/0406; F02D 41/126; F02D 2041/1432; F02D 13/0219; F02D 13/0265; F02D 41/021; F02D 2041/0012; F02D 2041/1412; F02D 2200/0804; F02D 2200/50; F01N 11/005; F01N 11/007; F01N 2900/1602; F01N 2900/1624; F01N 2430/02; F01N 2430/06; F01N 2430/08; Y02T 10/40; F02M 37/32
USPC .......................................................... 123/325
See application file for complete search history.

(56) References Cited

U.S. PATENT DOCUMENTS

| 7,497,805 B2 | 3/2009 | Seaman et al. | |
| 7,998,027 B2 | 8/2011 | Doering et al. | |
| 9,714,613 B2 | 7/2017 | Holub et al. | |
| 2008/0306669 A1* | 12/2008 | Wang | B60K 31/00 701/93 |
| 2011/0213540 A1* | 9/2011 | Tripathi | F02D 41/266 701/102 |
| 2013/0096810 A1* | 4/2013 | Correia | B60W 10/08 701/112 |
| 2015/0260143 A1* | 9/2015 | Yorke | F02N 11/0822 701/112 |
| 2018/0112605 A1* | 4/2018 | Ryan | F02D 11/02 |

\* cited by examiner

*Primary Examiner* — Scott A Reinbold
(74) *Attorney, Agent, or Firm* — Geoffrey Brumbaugh; McCoy Russell LLP

(57) ABSTRACT

Methods and systems are provided for protecting an exhaust catalyst from degradation during a DFSO event. Exit from DFSO due to pedal input received from an operator with a jittery foot is averted by filtering the pedal input differently when operating in a DFSO mode as compared to when operating out of the DFSO mode. Exit from DFSO is confirmed after receiving a higher than threshold pedal position input for a sustained period of time, or when an integrated fuel injection amount exceeds a threshold amount.

20 Claims, 7 Drawing Sheets

METHOD AND SYSTEM FOR ENGINE CONTROL

FIELD

The present description relates generally to methods and systems for controlling a vehicle engine to protect an exhaust catalyst during deceleration fuel shut-off (DFSO).

BACKGROUND/SUMMARY

During a mode of engine operation commonly known as deceleration fuel shut-off (DFSO), fuel injection to one or more engine cylinders may be interrupted. The DFSO mode is generally initiated when an engine powered vehicle is decelerating, and its engine output control element (throttle valve or accelerator pedal) is positioned for engine idling, i.e. no operator demand for additional engine output (e.g., responsive to an operator tip-out). As a result of the DFSO operation, fuel consumption is reduced, and engine braking is provided from frictional drag and negative torque applied to the engine by its load. Recovery from the DFSO mode typically occurs when either the engine rotational speed drops below a predetermined minimum speed near idle, or the engine control element is moved from the idling position to accelerate engine rotation and increase output torque (e.g., responsive to an operator tip-in).

One example of throttle control during a DFSO is shown by Holub et al in U.S. Pat. No. 9,714,613. Therein, the opening of a throttle is increased independently of operator commands when speed of a vehicle is expected to fall below a desired speed or desired speed trajectory. As a result, over-braking of the engine during a DFSO is reduced, and a duration of DFSO is extended, improving fuel savings.

However the inventors herein have recognized that the approach of '613 can aggravate catalyst degradation during a DFSO. In particular, some vehicle operators may have a "jittery foot" which unintentionally provides periodic input to the accelerator pedal during a DFSO. The transient pedal events result in transient throttle blips which can trigger transient fuel injection. At light cylinder loads during DFSO, combustion can be challenging. As a result, the fuel injected from the low levels of air charge associated with the throttle blips can cause misfires or partial burns. During DFSO, typically fuel injection is disabled while cylinder valves continue to pump air through the cylinders. Thus, there is always some amount of air being passed through the engine during the DFSO. The extra fuel from a misfire or partial burn can lead to an exothermic reaction at the exhaust catalyst, raising catalyst temperature. Over-temperature conditions can expedite exhaust catalyst degradation, reduce the useful life of the catalyst. Typically, a misfire monitor would detect the misfire and shut off the fuel injectors to pre-empt catalyst damage. However, the light load and low IMEP of the engine cylinders running at DFSO may make detection of the misfires difficult.

In one example, the issues described above may be addressed by a method for filtering operator pedal input during a DFSO to reduce catalyst degradation. The method includes while operating an engine with fuel disabled and air being pumped through cylinder valves, filtering operator pedal input with a different filter parameter relative to filtering during fueled engine operation; and resuming engine fueling based on the filtered operator pedal input.

As one example, when operating in a DFSO mode, an engine controller may filter operator pedal input and require the pedal input to remain higher than a threshold input for longer than a threshold duration to confirm the driver intent for increased torque demand. Consequently, if the throttle input increases temporarily, it may be assumed that increased torque was not demanded, and therefore fueling at low load, and an exit from DFSO, is not triggered. Alternatively, or additionally, the controller may monitor a vehicle trajectory. If the prevalent trend is deceleration, the controller may integrate the fuel amount associated with each transient pedal event (and associated throttle blip). Once the integrated fuel amount exceeds a threshold amount, further fuel injection is disabled. Further, the thresholds may be adjusted as a function of expected change in catalyst temperature and/or oxygen load. For example, the thresholds may be adjusted to ensure that fuel injection is resumed before the catalyst temperature drops below an activation temperature, and/or before the catalyst becomes oxygen saturated.

In this way, catalyst degradation during a DFSO may be reduced. In addition, premature exit from a DFSO can be averted, resulting in a DFSO being prolonged to achieve fuel economy savings. Specifically, by filtering an operator pedal input during DFSO, fuel injection can be enabled only upon confirming the driver intent. By limiting low load fuel injections following a DFSO, misfire and partial burns are reduced. In addition, the limited fuel flow protects the exhaust catalyst from thermal degradation. Overall, fuel savings are improved and catalyst life is extended.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
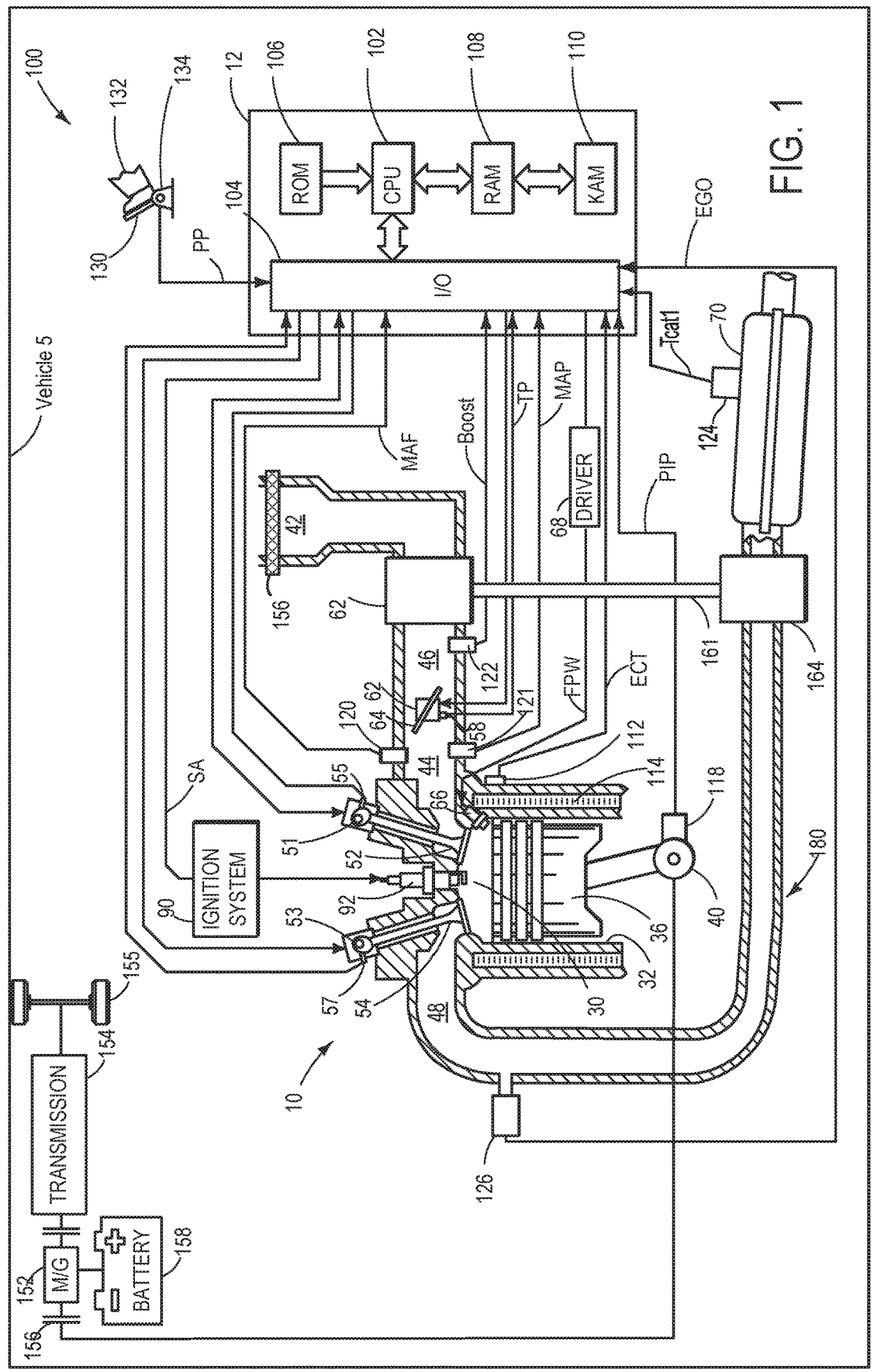
FIG. 1 is a schematic of an example engine system of a four stroke engine.
Figure 2:
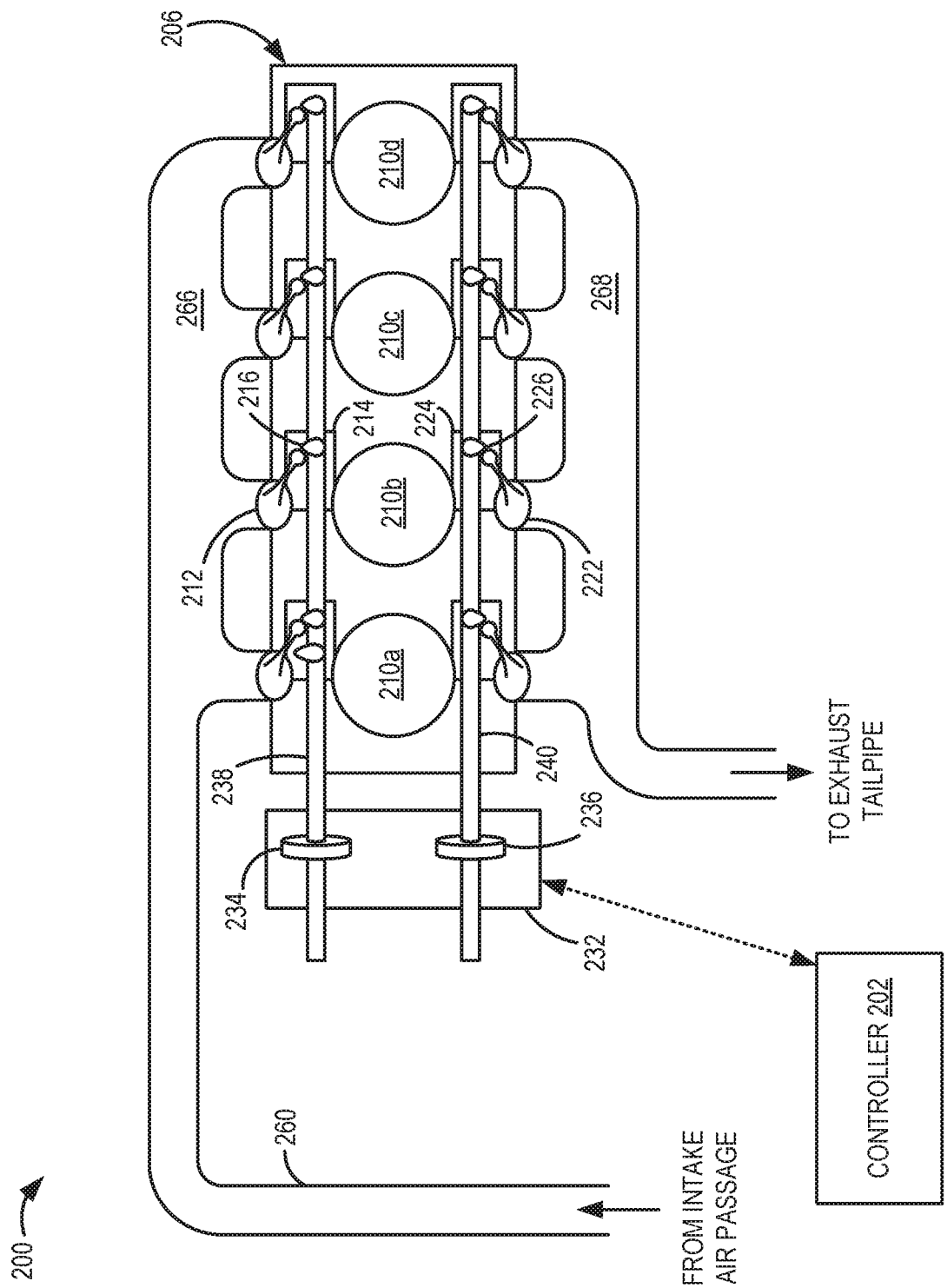
FIG. 2 is a schematic of an example engine system including a variable cam timing (VCT) mechanism for adjusting a position of a camshaft of the engine system.
Figure 6:
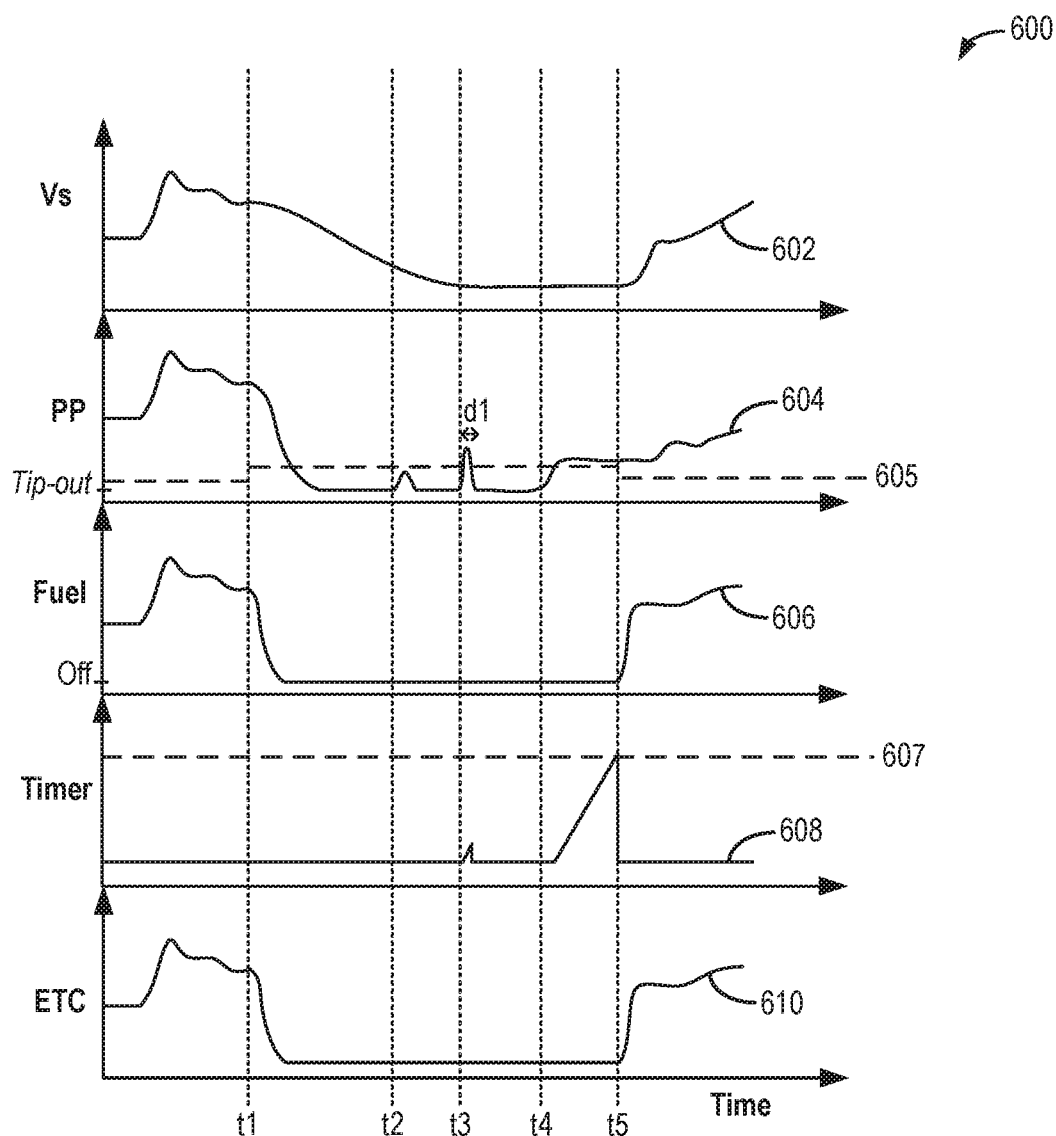
FIG. 6 shows a timeline for a prophetic example of DFSO mode entry and exit, wherein operator pedal input is filtered according to the method of FIG. 4.
Figure 7:
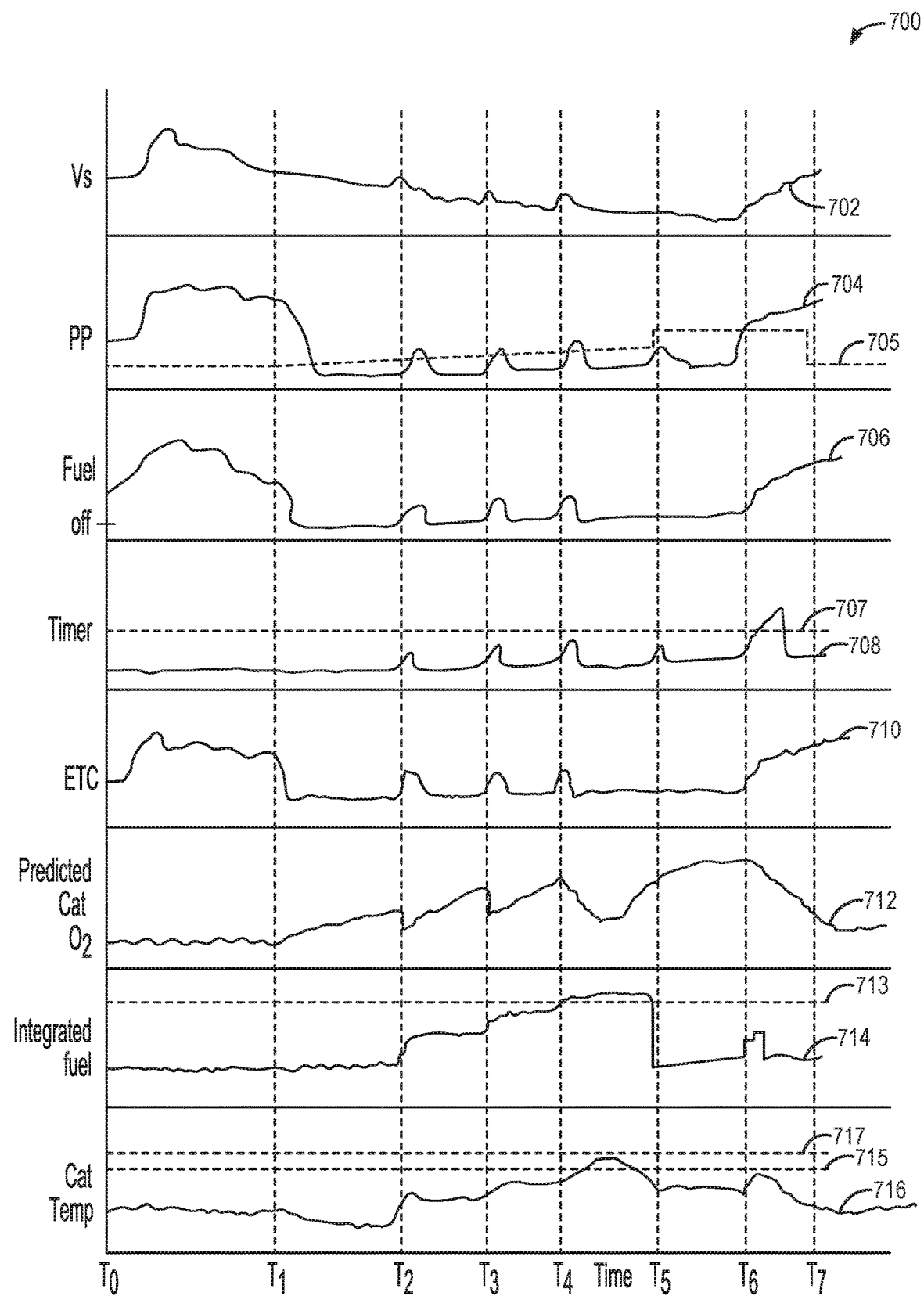
FIG. 7 shows a timeline for a prophetic example of DFSO mode entry and exit, wherein operator pedal input is filtered according to the method of FIG. 5.

Systems and methods for fuel control of an engine operating in DFSO are disclosed. Example engine systems are shown at FIGS. 1 and 2. Input from a vehicle operator during a DFSO may be filtered according to one or more control routines, such as the method of FIGS. 3-5, so as to limit low load fuel injection and DFSO exit due to a jittery foot of a vehicle operator. Example DFSO entry and exit scenarios with filtered operator pedal input is shown at FIGS. 6-7.

FIG. 1 depicts an engine system 100 for a vehicle 5. The vehicle 5 may be an on-road vehicle having drive wheels which contact a road surface. Engine system 100 includes engine 10 which comprises a plurality of cylinders. FIG. 1 describes one such cylinder or combustion chamber in detail. The various components of engine 10 may be controlled by electronic engine controller 12.

Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In addition, intake manifold 44 is shown communicating with electronic throttle 62 which adjusts a position of throttle plate 64 to control airflow to engine cylinder 30. This may include controlling airflow of boosted air from intake boost chamber 46. Electronic throttle 62 may be an electric motor, which is mechanically coupled to the throttle plate 64. As such, electrical input to the throttle 62, may be converted into mechanical rotational motion, which may be used to rotate the position of the throttle plate 64.

The throttle 62 may adjust the position of the throttle plate 64 based on signals received from the controller 12. Thus, based on a desired engine torque, and engine operating conditions, the controller 12 may determine a desired throttle plate 64 position, and send signals to the throttle 62, for adjusting the position of the throttle plate 64 to the desired position.

Ambient air is drawn into combustion chamber 36 via intake passage 42, which may include air filter 56. Thus, air first enters the intake passage 42 through air filter 56. When included, compressor 162 then draws air from air intake passage 42 to supply boost chamber 46 with compressed air via a compressor outlet tube (not shown in FIG. 1). In some examples, air intake passage 42 may include an air box (not shown) with a filter. In one example, compressor 162 may be a turbocharger, where power to the compressor 162 is drawn from the flow of exhaust gasses through turbine 164. Specifically, exhaust gases may spin turbine 164 which may be coupled to compressor 162 via shaft 61.

However, in alternate embodiments, the compressor 162 may be a supercharger, where power to the compressor 162 is drawn from the crankshaft 40. Thus, the compressor 162 may be coupled to the crankshaft 40 via a mechanical linkage, which may be any suitable linkage for mechanically coupling the crankshaft 40 to the compressor 162, such as a belt. As such, a portion of the rotational energy output by the crankshaft 40, may be transferred via the mechanical linkage to the compressor 162 for powering the compressor 162. In still further examples, the engine 10 may not include the compressor 162, and as such the engine 10 may not be a boosted engine.

Distributorless ignition system 90 provides an ignition spark to combustion chamber 30 via spark plug 92 in response to controller 12. The ignition system 90 may include an induction coil ignition system, in which an ignition coil transformer is connected to each spark plug of the engine. Universal Exhaust Gas Oxygen (UEGO) sensor 126 is shown coupled to exhaust manifold 148 upstream of exhaust catalyst 70. Alternatively, a two-state exhaust gas oxygen sensor may be substituted for UEGO sensor 126. While the depicted example shows UEGO sensor 126 upstream of turbine 164, it will be appreciated that in alternate embodiments, UEGO sensor may be positioned in the exhaust manifold downstream of turbine 164 and upstream of convertor 70.

Catalyst 70 can include multiple catalyst bricks, in one example. In another example, multiple emission control devices, each with multiple bricks, can be used. Exhaust catalyst 70 can be a three-way type catalyst in one example. Thus, catalyst 70 may be configured to reduce nitrogen oxides (NOx), and oxidize carbon monoxide (CO) and unburnt hydrocarbons (HCs) to water and carbon dioxide. The air/fuel ratio entering the engine 10 may be regulated by controller 12 so that the air-fuel ratio is continuously cycled closely about the stoichiometric air-fuel ratio. In some examples, the stoichiometric air-fuel ratio may be an air-fuel ratio of approximately 14.7:1. In this way, the exhaust gas passing over the catalytic surfaces of the catalyst 70 is alternatively rich in oxygen and deficient in oxygen so as to promote the nearly simultaneous oxidation and reduction reactions. The catalyst 70 may be formed as a ceramic monolith with a honeycomb structure. Further, the surfaces of the catalyst 70 may comprise one or more noble metal materials for holding the catalytic materials used in the oxidation and reduction reactions. Suitable elements to be used for retaining the catalytic materials may include aluminum oxide, titanium dioxide, silicon dioxide, and a mixture of silica and alumina can be used. One or more of platinum, palladium, rhodium, cerium, iron, manganese and nickel may be used as catalytic materials in performing the oxidation and reduction reactions of the catalyst 70.

When the engine 10 runs lean, where the air-fuel ratio is greater than stoichiometric, excess oxygen may be stored in the catalyst 70, for later use during conditions where the engine 10 is running rich and the exhaust gasses are oxygen deficient. An oxygen storage material such as ceria ($CeO_2$) may be therefore included in the catalyst 70 for storing oxygen during lean engine operating conditions. Thus, the catalyst 70 may be capable of temporarily storing oxygen during the oxygen-rich portions of the air-fuel cycles so as to provide oxygen for the oxidation reactions when the exhaust gas is momentarily oxygen deficient. However, the catalyst 70 may only be capable of storing up to a threshold amount of oxygen. Thus, the catalyst 70 may be referred to as saturated, when the oxygen storage content of the catalyst 70 has reached the threshold, where substantially no additional oxygen may be stored by the catalyst.

Further, a temperature, Tcat1, of the catalyst 70 may be estimated based on outputs from a temperature sensor 124 coupled to the catalyst 70. Thus, the temperature sensor 124 may be physically coupled to the catalyst 70 and may be configured to measure/estimate a temperature of the catalyst. During DFSO, a temperature of the catalyst may decrease as the temperature of exhaust gasses may be reduced. However, in an alternate embodiment, temperature Tcat1 may be inferred from engine operation.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

The controller 12 may determine a desired position of the throttle plate 64 based on one or more of inputs received from the input device 130 and pedal position (PP) signal, a vehicle weight, road incline, transmission gear, etc. In this particular example, the position of the throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. More specifically, the throttle 62 may be an electric motor, which may be mechanically coupled to the throttle plate 64, for adjusting the position of the throttle plate 64 based on signals received from the controller 12. Thus electrical input to the throttle 62 may be converted to mechanical rotational energy, used to adjust the position of the throttle plate 64, and vary airflow to the engine cylinder 30.

During certain operating conditions, such as during coasting or when descending down a hill, the engine 10 may enter a deceleration fuel shut-off (DFSO) mode, where fuel injection to the cylinder 30 may be terminated. DFSO mode may be entered responsive to a drop in operator torque demand, such as when the operator releases their foot from an accelerator pedal. Responsive to DFSO entry conditions being met, fuel may be selectively deactivated to engine cylinders by disabling corresponding fuel injectors. However, cylinder intake and exhaust valves may continue to pump air through the cylinder. As a result, there may be at least some air in the engine cylinders and manifolds during the DFSO. When the operator torque demand increases, such as responsive to a pedal tip-in, exit from the DFSO mode may be confirmed and fuel injection may be resumed.

In some examples, as is explained in greater detail below with reference to FIGS. 3-5, an engine controller may filter operator pedal input during the DFSO to distinguish actual torque increases requested by the operator from unintentional pedal events due to an operator's jittery foot. In one example, the filter may be a digital filter implemented within the controller. Exit from the DFSO mode and resuming of cylinder fueling may be adapted accordingly.

In some embodiments, the engine may be coupled to an electric motor/battery system in a hybrid vehicle. The hybrid vehicle may have a parallel configuration, series configuration, or variation or combinations thereof.

In some examples, vehicle 5 may be a hybrid vehicle with multiple sources of torque available to one or more vehicle wheels 155. In other examples, vehicle 5 is a conventional vehicle with only an engine, or an electric vehicle with only electric machine(s). In the example shown, vehicle 5 includes engine 10 and an electric machine 152. Electric machine 152 may be a motor or a motor/generator. Crankshaft 40 of engine 10 and electric machine 152 are connected via a transmission 154 to vehicle wheels 155 when one or more clutches 156 are engaged. In the depicted example, a first clutch 156 is provided between crankshaft 40 and electric machine 152, and a second clutch 156 is provided between electric machine 152 and transmission 154. Controller 12 may send a signal to an actuator of each clutch 156 to engage or disengage the clutch, so as to connect or disconnect crankshaft 40 from electric machine 152 and the components connected thereto, and/or connect or disconnect electric machine 152 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 152 receives electrical power from a traction battery 158 to provide torque to vehicle wheels 155. Electric machine 152 may also be operated as a generator to provide electrical power to charge battery 158, for example during a braking operation.

During operation, each cylinder within engine 10 typically undergoes a four stroke cycle: the cycle includes the intake stroke, compression stroke, expansion stroke, and exhaust stroke. Thus, engine 10 may be a four stroke engine. Generally, the piston 36 may move away from top dead center (TDC), towards bottom dead center (BDC) during the intake and expansion strokes. Conversely, during the compression stroke and exhaust stroke, the piston 36 may move away from BDC towards TDC. During the intake stroke, generally, the exhaust valve 54 may close and intake valve 52 may open so that gasses from the engine intake may enter the cylinder 30. In the compressions stroke and expansion stroke, the intake valve 52 may be closed, and the exhaust valve 54 may remain closed. During the exhaust stroke the intake valve 52 may remain closed, and the exhaust valve 54 may be opened. The position of the valves 52 and 54, may be adjusted by a camshaft (not shown in FIG. 1). As described in greater detail below with reference to FIG. 2, the position of the camshaft, and therefore the position of the valves 52 and 54 may be adjusted depending on engine operating conditions. Specifically, the position of the camshaft relative to the crankshaft 40 may be adjusted by adjusting the position of the camshaft.

Crankshaft 40 converts piston movement into a rotational torque of the rotary shaft. During the exhaust stroke, the exhaust valve 54 opens to release the combusted air-fuel mixture to exhaust manifold 48. Exhaust gasses may continue to flow from the exhaust manifold 48, to the turbine 64 via an exhaust passage 80. Further, exhaust gasses may flow past the catalyst 70, before being emitted to the atmosphere. Note that the above is described merely as an example, and that intake and exhaust valve opening and/or closing timings may vary, such as to provide positive or negative valve overlap, late intake valve closing, or various other examples.

FIG. 2 shows an example embodiment of an engine 200 including a controller 202, a variable cam timing (VCT) system 232, and an engine block 206 with a plurality of cylinders 210. Engine 200 may be one example of engine 10 described in FIG. 1. Thus, FIG. 2 shows an example VCT system which may be employed in the engine 10 described in FIG. 1, to adjust the timing of the opening and closing of the intake valve 52 and exhaust valve 54 of engine 10. Engine 200 is shown having an intake manifold 266 configured to supply intake air and/or fuel to the cylinders 210a-d and an exhaust manifold 268 configured to exhaust the combustion products from the cylinders 210. Ambient air flow can enter the intake system through intake air passage 260, wherein the flow rate and/or pressure of the intake air can be controlled at least in part by a main throttle (not shown).

Engine block 206 includes a plurality of cylinders 210a-d (herein four). In the depicted example, all the cylinders are on a common engine bank. In alternate embodiments, the cylinders may be divided between a plurality of banks. For example, cylinders 210a-b may be on a first bank while cylinder 210c-d may be on a second bank. Cylinders 210a-d may each include a spark plug and a fuel injector for delivering fuel directly to the combustion chamber, as described above in FIG. 1. Also, cylinders 210a-d may each be serviced by one or more valves. In the present example, each cylinder 210a-d includes a corresponding intake valve 212 and an exhaust valve 222. As elaborated below, engine 200 further includes one or more camshafts 238, 240 wherein each camshaft can be actuated to operate intake and/or exhaust valves of a plurality of cylinders coupled to a common camshaft.

Each intake valve 212 is actuatable between an open position that allows intake air into the corresponding cylinder and a closed position substantially blocking intake air from the cylinder. Further, FIG. 2 shows how intake valves 212 of cylinders 210a-d may be actuated by a common intake camshaft 238. Intake camshaft 238 may be included in intake valve actuation system 214. Intake camshaft 238 includes intake cam lobes 216 which have a lift profile for opening the intake valves 212 for a defined intake duration. In some embodiments (not shown), the camshaft may include additional intake cam lobes with an alternate lift profile that allows the intake valves 212 to be opened for an alternate lift and/or duration (herein also referred to as a cam profile switching system). Based on the lift profile of the additional cam lobe, the alternate duration may be longer or shorter than the defined intake duration of intake cam lobe 216. The lift profile may affect cam lift height, cam duration, opening timing, and/or closing timing. A controller may be able to switch the intake valve duration by moving the intake cam lobes 216 longitudinally and switching between cam profiles. In another embodiment, a controller may be able to switch the intake valve duration by latching or unlatching rocker arms, cam followers, or other mechanisms between cam lobes 216 and intake valves 216.

In the same manner, each exhaust valve 222 is actuatable between an open position allowing exhaust gas out of the corresponding cylinder and a closed position substantially retaining gas within the cylinder. Further, FIG. 2 shows how exhaust valves 222 of cylinders 210a-d may be actuated by a common exhaust camshaft 240. Exhaust camshaft 240 may be included in exhaust valve actuation system 224. Exhaust camshaft 240 includes exhaust cam lobes 226 which have a lift profile for opening the exhaust valves 222 for a defined exhaust duration. In some embodiments (not shown), the camshaft may include additional exhaust cam lobes with an alternate lift profile that allows the exhaust valves 222 to be opened for an alternate lift and/or duration. Based on the lift profile of the additional cam lobe, the alternate duration may be longer or shorter than the defined exhaust duration of exhaust cam lobe 226. The lift profile may affect cam lift height, cam duration, opening timing, and/or closing timing. A controller may be able to switch the exhaust valve duration by moving the exhaust cam lobes 226 longitudinally and switching between cam profiles. In another embodiment, a controller may be able to switch the exhaust valve duration by latching or unlatching rocker arms, cam followers, or other mechanisms between cam lobes 226 and exhaust valves 222.

It will be appreciated that while the depicted example shows common intake camshaft 238 coupled to the intake valves of each cylinder 210a-d, and common exhaust camshaft 240 coupled to the exhaust valves of each cylinder 201a-d, in alternate embodiments, the camshafts may be coupled to cylinder subsets, and multiple intake and/or exhaust camshafts may be present. For example, a first intake camshaft may be coupled to the intake valves of a first subset of cylinders (e.g., coupled to cylinders 210a-b) while a second intake camshaft may be coupled to the intake valves of a second subset of cylinders (e.g., coupled to cylinders 210c-d). Likewise, a first exhaust camshaft may be coupled to the exhaust valves of a first subset of cylinders (e.g., coupled to cylinders 210a-b) while a second exhaust camshaft may be coupled to the exhaust valves of a second subset of cylinders (e.g., coupled to cylinders 210c-d). Further still, one or more intake valves and exhaust valves may be coupled to each camshaft. The subset of cylinders coupled to the camshaft may be based on their position along the engine block 206, their firing order, the engine configuration, etc.

Intake valve actuation system 214 and exhaust valve actuation system 224 may further include push rods, rocker arms, tappets, etc. Such devices and features may control actuation of the intake valves 212 and the exhaust valves 222 by converting rotational motion of the cams into translational motion of the valves. As previously discussed, the valves can also be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders 210a-d may each have more than one exhaust valve and/or intake valve. In still other examples, each of the exhaust valve 222 and intake valve 212 of one or more cylinders may be actuated by a common camshaft. Further still, in some examples, some of the intake valves 212 and/or exhaust valves 222 may be actuated by their own independent camshaft or other device.

Engine 200 may include variable valve timing systems, for example, variable cam timing VCT system 232. VCT system 232 may be a twin independent variable camshaft timing system, for changing intake valve timing and exhaust valve timing independently of each other. VCT system 232 includes intake camshaft phaser 234 coupled to the common intake camshaft 238 for changing intake valve timing and exhaust camshaft phaser 236 coupled to common exhaust camshaft 240 for changing exhaust valve timing. VCT system 232 may be configured to advance or retard valve timing by advancing or retarding cam timing and may be controlled via signal lines by controller 202. VCT system 232 may be configured to vary the timing of valve opening and closing events by varying the relationship between the crankshaft position and the camshaft position. For example, VCT system 232 may be configured to rotate intake camshaft 238 and/or exhaust camshaft 240 independently of the crankshaft to cause the valve timing to be advanced or retarded. In some embodiments, VCT system 232 may be a cam torque actuated device configured to rapidly vary the cam timing. In some embodiments, valve timing such as intake valve closing (IVC) and exhaust valve closing (EVC) may be varied by a continuously variable valve lift (CVVL) device.

The valve/cam control devices and systems described above may be hydraulically actuated, or electrically actuated, or combinations thereof. In one example, a position of the camshaft may be changed via cam phase adjustment of an electrical actuator (e.g., an electrically actuated cam phaser) with a fidelity that exceeds that of most hydraulically operated cam phasers. Signal lines can send control signals to and receive a cam timing and/or cam selection measurement from VCT system 232.

In the depicted example, since the intake valves of all the cylinders 210a-d are actuated by a common intake camshaft, a change in the position of the intake camshaft 238 will affect the intake valve position and timing of all the cylinders. Likewise, since the exhaust valves of all the cylinders 210a-d are actuated by a common exhaust camshaft, a change in the position of the exhaust camshaft 240 will affect the exhaust valve position and timing of all the cylinders. For example, a change in position of the intake and/or exhaust camshaft that advances the (intake or exhaust) valve timing of a first cylinder 210a will also advance the (intake or exhaust) valve timing of the remaining cylinders 210b-d at the same time. However, adjustment of the valve timing may be performed on one or more cylinders independent of the valve timing of the remaining cylinders.

As described above, FIG. 2 shows a non-limiting example of an internal combustion engine and associated intake and exhaust systems. It should be understood that in some embodiments, the engine may have more or fewer combustion cylinders, control valves, throttles, and compression devices, among others. Example engines may have cylinders arranged in a "V" configuration. Further, a first common camshaft may control the valves for a first set of cylinders on a first bank while a second camshaft may control the valves for a second set of cylinders on a second bank. That is, a common camshaft of a cam actuation system (e.g., a VCT system) may be used to control valve operation of a group of cylinders.

Thus, FIG. 2 illustrates variable valve timing systems that may be used to adjust the intake valve opening, intake valve closing, exhaust valve opening, and exhaust valve closing events of one or more cylinders of an engine.

Figure 3:
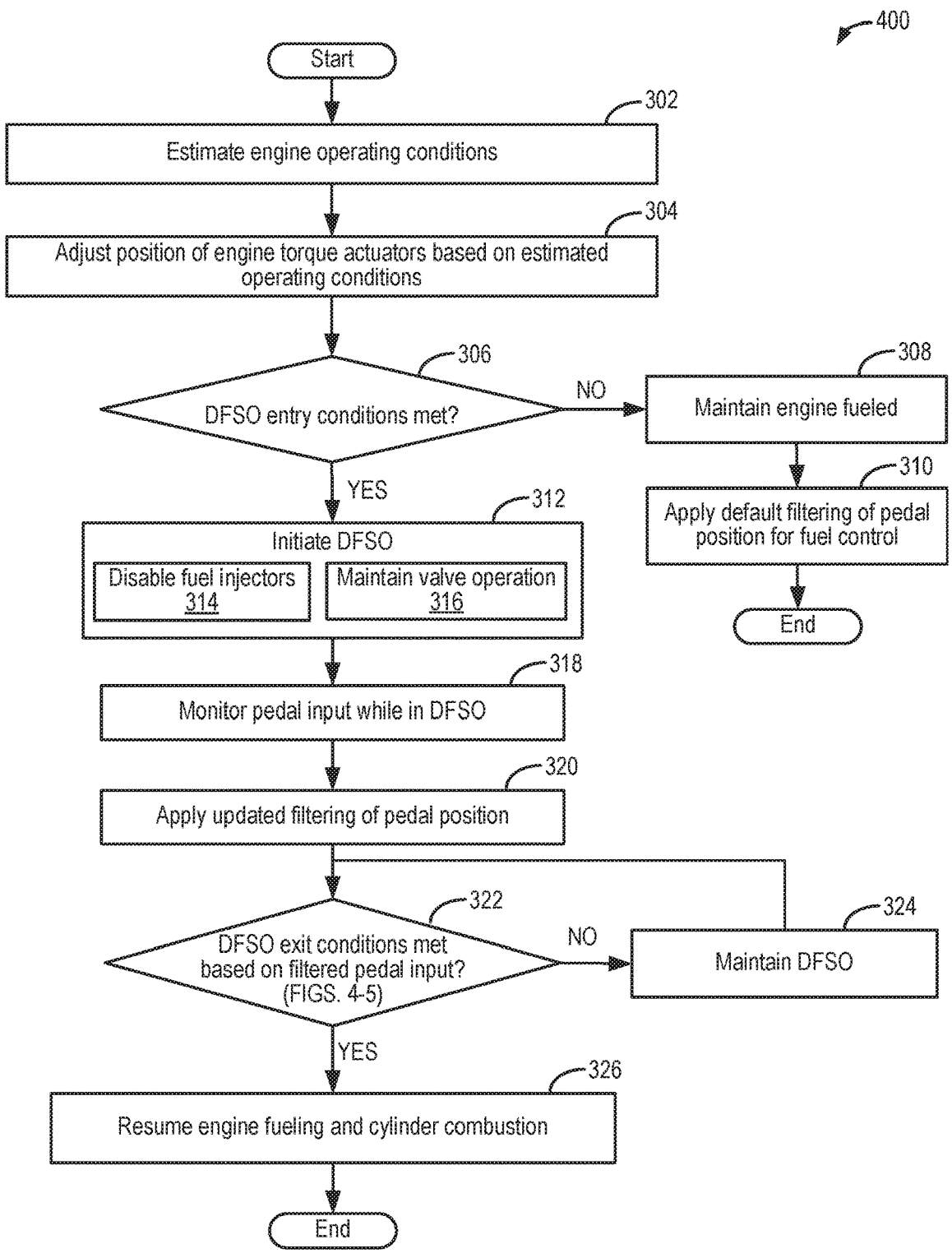
FIG. 3 is a flow chart of an example method for operating an engine system to enable entry and exit from a DFSO mode of operation.

Turning now to FIG. 3, it shows a flow chart of an example method 300 for controlling an engine operation when entering and exiting a DFSO mode. During engine operation, if a driver demanded torque decreases below a threshold, fuel may not be injected to engine cylinders (e.g., engine cylinder 30 shown in FIG. 1) to reduce fuel consumption. Thus, during DFSO, cylinder combustion may be terminated. During the DFSO, operator pedal input may be filtered to confirm that DFSO exit conditions have been met before engine fueling is resumed. Instructions for carrying out method 300 and the rest of the methods included herein may be executed by a controller (e.g., controller 12 shown in FIG. 1) based on instructions stored on a memory of the controller and in conjunction with signals received from sensors of the engine system, such as the sensors described above with reference to FIG. 1. The controller may employ engine actuators of the engine system to adjust engine operation, according to the methods described below. In particular, the controller may adjust the operation of a fuel injector (e.g., injector 66 shown in FIG. 1) based on sensor input indicative of torque changes requested by a vehicle operator (e.g., sensor 134 coupled to input device 130 shown in FIG. 1) and instructions stored in the memory of the controller. Specifically, the controller may re-enable a disabled fuel injector only after sensor input from the operator input device has been remained higher than a threshold for a prolonged duration.

Method 300 begins at 302 which comprises estimating and/or measuring engine operating conditions. Engine operating conditions may include an engine speed, a throttle position as estimated based on outputs from a throttle position sensor (e.g., sensor 58 shown in FIG. 1), an operator commanded torque which may be estimated based on outputs from the position sensor of the input device (e.g., sensor 134 coupled to device 130), an oxygen storage level in an exhaust catalyst (e.g., exhaust catalyst 70 shown in FIG. 1), a fuel injection amount, an intake mass air flow as determined from a mass air flow sensor (e.g., sensor 120 shown in FIG. 1), vehicle speed, etc.

At 304, the method includes adjusting the position of one or more engine torque actuators based on estimated operating conditions. For example, a desired throttle position may be determined based on inputs from a vehicle operator via the input device. As another example, a fuel injection pulse-width may be adjusted based on the operator torque demand. As yet another example, a boost pressure may be adjusted via changes to a waste-gate valve position, to provide a boost pressure based on the operator torque demand.

At 306, the method includes confirming if DFSO entry conditions are met. In one example, DFSO entry conditions are met responsive to one or more of operator release of an accelerator pedal, drop in operator torque demand to below a threshold, and vehicle deceleration. If DFSO conditions are not met, then at 308, the engine is maintained fueled. At 310, while operating the engine fueled, a default filtering of pedal position is applied for fuel control. For example, when not in the DFSO mode, the controller may refer to a default look-up table that maps fuel injection (that is, an amount of fuel to be delivered) to pedal position with a default gain function. The method then exits.

If DFSO conditions are met, then at 312 the method includes initiating a DFSO operation. This includes, at 314, disabling cylinder fuel injectors while maintaining intake and exhaust valve operation at 316. As a result, air is pumped without fuel through the engine cylinders and the engine is spun down towards rest via engine compression braking.

At 318, while in DFSO, the controller may monitor operator pedal input, such as based on sensor input from a sensor coupled to the accelerator pedal and/or brake pedal. At 320, the method includes applying an updated filtering of the pedal position. As elaborated with reference to FIGS.

4-5, the controller may refer to an alternate DFSO mode table that maps fuel injection to pedal position, the DFSO mode table having a different gain function than the default gain function of the default table. In particular, the DFSO filtering may require a larger and/or longer pedal displacement before fuel injection is enabled.

At 322, the method includes determining if DFSO exit conditions are met based on the filtered pedal input. As elaborated with reference to FIGS. 4-5, this may include a higher than threshold input being maintained during the DFSO for longer than a threshold duration, and/or an integrated fuel amount from a plurality of smaller than threshold pedal events, occurring during the DFSO, exceeding a threshold fuel amount. If DFSO exit conditions are not met, then at 324, the DFSO mode is maintained. Else, if DFSO exit conditions are met, then at 326, the method includes resuming engine fueling and cylinder combustion in all engine cylinders. For example, the controller may adjust an intake throttle position based on the pedal input, and then adjust a cylinder fueling based on the air charge corresponding to the throttle position to provide a target air-fuel ratio, such as a stoichiometric air-fuel ratio. The method then ends.

Figure 4:
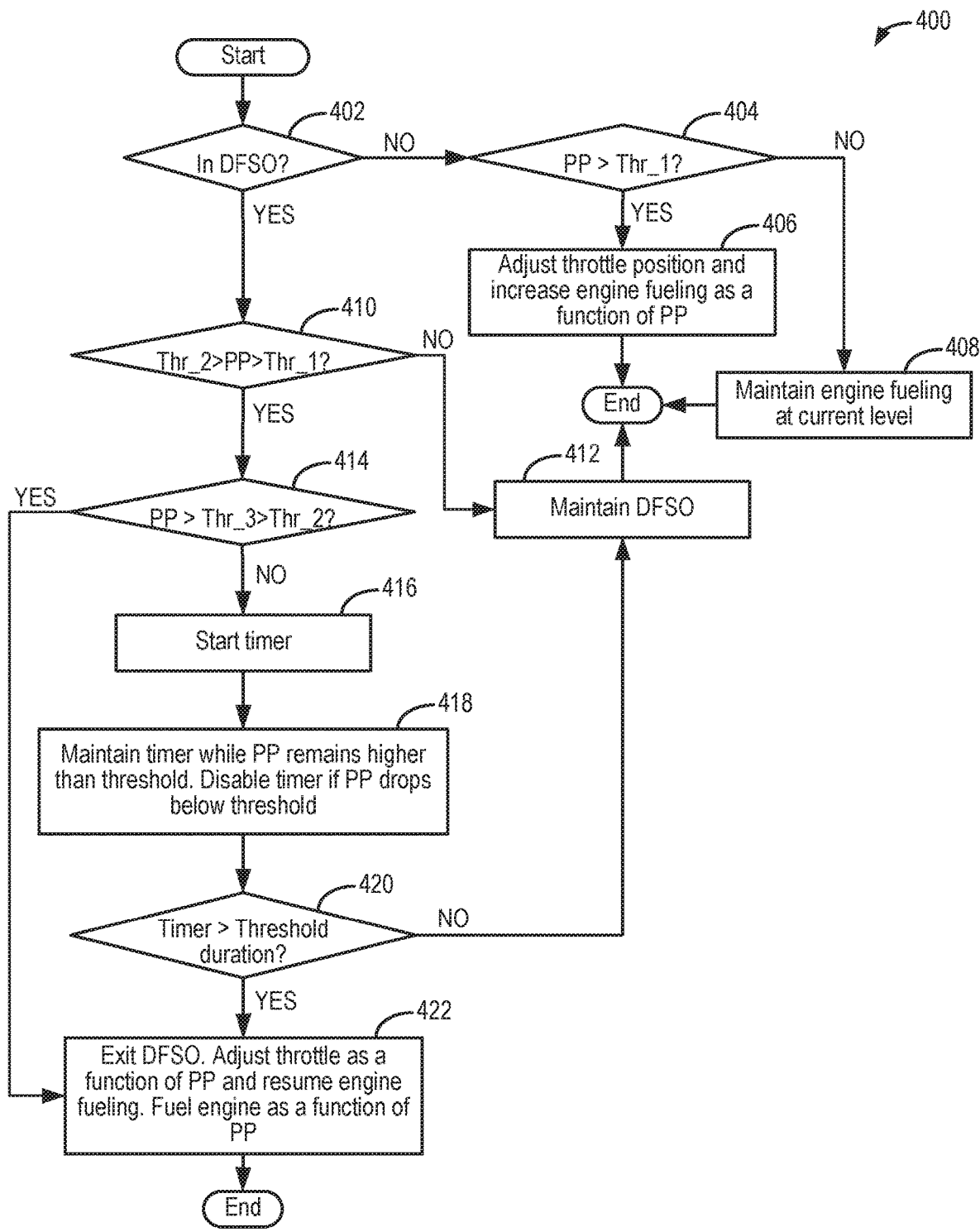
FIG. 4 shows a flow chart of an example method of filtering an operator pedal input before confirming exit from a DFSO mode of engine operation.

Turning now to FIG. 4, an example method of confirming DFSO exit conditions based on filtering of operator pedal input over a DFSO is shown at method 400. In one example, the method of FIG. 4 is incorporated in the method of FIG. 3, such as at 322. Operator pedal displacement may be inferred in the method of FIG. 4 based on input from a sensor coupled to an operator device, such as a pedal position sensor coupled to an accelerator pedal.

At 402, the method includes confirming that the engine is operating in a DFSO mode with cylinder fueling disabled and valve operation enabled. If not, the engine is operating fueled with fuel delivered in accordance with a default map. Therein, at 404, it may be determined if the pedal position is higher than a first threshold (Thr1) or if the operator has displaced the pedal by higher than a first threshold amount. If not, engine fueling is maintained at the existing current level. Else, responsive to the higher than threshold displacement, at 406, the throttle may be displaced in proportion to the change in pedal position. Further, engine fueling is adjusted as a first function of the displacement. That is, engine fueling is increased in proportion to the increase in accelerator pedal displacement. Further, as long as the accelerator pedal is displaced by more than the first threshold (so as to not trigger entry into DFSO), engine fueling may be decreased in proportion to a change in throttle position to a more closed position responsive to a decrease in accelerator pedal displacement. The method then exits.

If DFSO mode of operation is confirmed, then at 410, it may be determined if the pedal position is higher than a second threshold (Thr2) or if the operator has displaced the pedal by higher than a second threshold amount. The second threshold and second threshold amount referred to in the DFSO mode are higher than the corresponding first threshold and first threshold amount of the non-DFSO mode (at 404). In other words, the controller monitors for a higher operator displacement when in the DFSO mode as compared to when not in the DFSO mode.

If the pedal displacement is not higher than the second threshold, such as when the pedal is displacement is higher or lower than the first threshold (Thr1), the method moves to 412 to maintain the engine in DFSO. In other words, when the engine is not in DFSO mode, and the pedal position has been displaced by a first threshold amount, engine fueling is adjusted as a function of the pedal position. However, when the engine is in DFSO mode, even if the pedal position has been displaced by the first threshold amount, engine fueling is not adjusted as a function of the pedal position. Instead, engine fueling is maintained disabled. As a result, small and transient or intermittent pedal displacements resulting from a jittery operator foot do not trigger an exit out of the DFSO mode. By disabling fueling at low load while in DFSO, misfires and partial burns induced by the associated transient fuel change are averted.

At 414, it may be determined if the pedal position is higher than a third threshold (Thr3) or if the operator has displaced the pedal by higher than a third threshold amount. The third threshold and third threshold amount are higher than the corresponding second threshold and second threshold amount of the non-DFSO mode (at 410). In other words, the controller monitors for a higher than threshold operator displacement when in the DFSO mode before triggering a fuel response.

If a higher than third threshold displacement is confirmed, then at 422, the method includes confirming DFSO conditions and resuming engine fueling. Thereafter, engine fueling is provided in proportion to pedal position.

If the higher than third threshold displacement is not confirmed, then at 416, the method includes starting a timer that monitors a duration over which the displacement remains higher than the third threshold. In particular, at 418, the method includes maintaining the timer on/running while operator pedal input remains higher than the third threshold. Further, the controller may disable the timer if the operator pedal input drops below the third threshold (even if the displacement is higher than the first and/or second threshold).

At 420, it may be determined if the timer output is higher than a threshold duration. Herein, the threshold duration is a non-zero threshold duration determined as a function of catalyst conditions. In particular, the threshold duration may be based on the temperature and/or the oxygen loading state of an exhaust catalyst. For example, the threshold duration may be inferred via a catalyst temperature model. In an example, a lower inferred catalyst temperature may result in a lower threshold duration.

If yes, then the method moves to 422 wherein responsive to a higher than threshold pedal input for longer than a threshold duration, it may be confirmed that the driver intent is to accelerate the vehicle and that the increase in torque demand is not a transient demand due to jittery operator foot. Accordingly, the DFSO mode is exited, throttle movement is activated, and engine fueling is resumed. The higher than threshold input and threshold duration may each be a function of the catalyst configuration. As an example, the higher than threshold input may include 10-15% pedal displacement sustained for 1-1.5 seconds. As another example, the higher than threshold pedal input may include 10% pedal displacement followed by additional increasing pedal (that is, the driver may be demanding more torque responsive to not getting the results desired, thereby indicating an intent to accelerate). Else, if the pedal position remains higher than the threshold but for shorter than the threshold duration, then DFSO is maintained at 412.

In this way, pedal input filtering is adjusted while operating in DFSO so that pedal input for longer periods above threshold are required before activating actual throttle movement and resuming fuel delivery.

An example timeline of engine operation for a vehicle with DFSO entry and exit in accordance with the method of FIG. 4 is now described with reference to FIG. 6. Map 600 depicts vehicle speed at plot 602, operator pedal position (PP, indicative of torque demand) at plot 604, engine fueling at plot 606, output of a timer at plot 608, and the position of an intake throttle (electronic throttle control) at plot 610. All plots are shown over time along the x-axis.

Prior to t1, the vehicle is travelling (plot 602) with the engine operating fueled (plot 606). At this time, engine fueling is adjusted as a function of operator accelerator pedal position (plot 604). More specifically, responsive to operator pedal displacement to beyond a threshold pedal position 605, engine is delivered with fuel. In particular, the intake throttle opening (plot 610) is adjusted as a function of the pedal position, and the engine fueling is adjusted as a function of the air charge ingested via the throttle opening so as to maintain a target air-fuel ratio (such as at or around stoichiometry). Since the DFSO mode is not being operated at this time, the timer (plot 608) is disabled.

At t1, responsive to an operator pedal tip-out, and a corresponding drop in torque demand, a DFSO mode is entered by disabling engine fueling. At the same time, cylinder valves are maintained operational so that the engine continues to pump air through the cylinders. As a result of entering the DFSO mode, the vehicle starts to decelerate. Also responsive to the DFSO mode, a timer is enabled. However, time is not counted up on the timer until a pedal event occurs while in the DFSO mode. Between t1 and t2, there is no operator pedal event. Further, responsive to the DFSO mode being entered, threshold pedal position 605 is raised relative to the threshold level in the non-DFSO mode prior to t1. In one example, the threshold pedal position is raised from a default non-DFSO mode value to a default DFSO mode value. For example, the DFSO mode threshold position may be 5-10% higher than the default non-DFSO mode threshold position. In an alternate example, the DFSO mode threshold position may be raised relative to the non-DFSO mode threshold position as a function of integrating the amount of fuel introduced from subsequent tip-ins. The energy introduced can be used by the model to estimate the temperature increase from an exothermic reaction in the catalyst. In some examples, the threshold position may be temporarily raised for each subsequent tip-in based on modeled catalyst temperature.

At t2, there is a transient pedal event. In particular, the transient operator pedal event includes a displacement of the accelerator pedal to lower than threshold pedal position 605. Responsive to the pedal displacement being lower than the threshold position, the timer does not count any time. Herein, the pedal event may have been due to an operator's jittery foot, rather than an actual demand for increased torque. Therefore, even though the pedal is depressed, the intake throttle is maintained closed, and engine fueling is maintained disabled.

At t3, there is another transient pedal event. This transient operator pedal event includes a displacement of the accelerator pedal to higher than threshold pedal position 607. Responsive to the higher than threshold pedal event, the timer starts to count a duration for which the pedal remains depressed beyond the threshold position. When the pedal is released, the timer stops counting. Herein the pedal remains at the higher than threshold position for duration d1. However, due to the duration d1 being smaller than a threshold duration 607, it may be inferred that the pedal event is transient, such as due to an operator's jittery foot, and not due to an actual demand for increased torque. Therefore, even though the pedal is depressed, the intake throttle is maintained closed, and engine fueling is maintained disabled.

At t4, there is yet another pedal event. This operator pedal event includes a displacement of the accelerator pedal to higher than threshold pedal position 607. Responsive to the higher than threshold pedal event, the timer starts to count a duration for which the pedal remains depressed beyond the threshold position. When the pedal is released, the timer stops counting. Herein the pedal remains at the higher than threshold position for a duration d2 from t4 to t4 corresponding to the threshold duration 607. Consequently, it may be inferred that the pedal event is not due to an operator's jittery foot, but due to an actual demand for increased torque. Therefore, responsive to the sustained higher than threshold pedal depression, the intake throttle is enabled, and engine fueling is resumed. At t5, the DFSO mode is exited and the engine resumes fueled operation. In addition, the pedal position threshold is lowered to a default value applied during the non-DFSO mode. In this way, throttle enablement is resumed while in DFSO only when a prolonged operator pedal displacement is confirmed.

Figure 5:
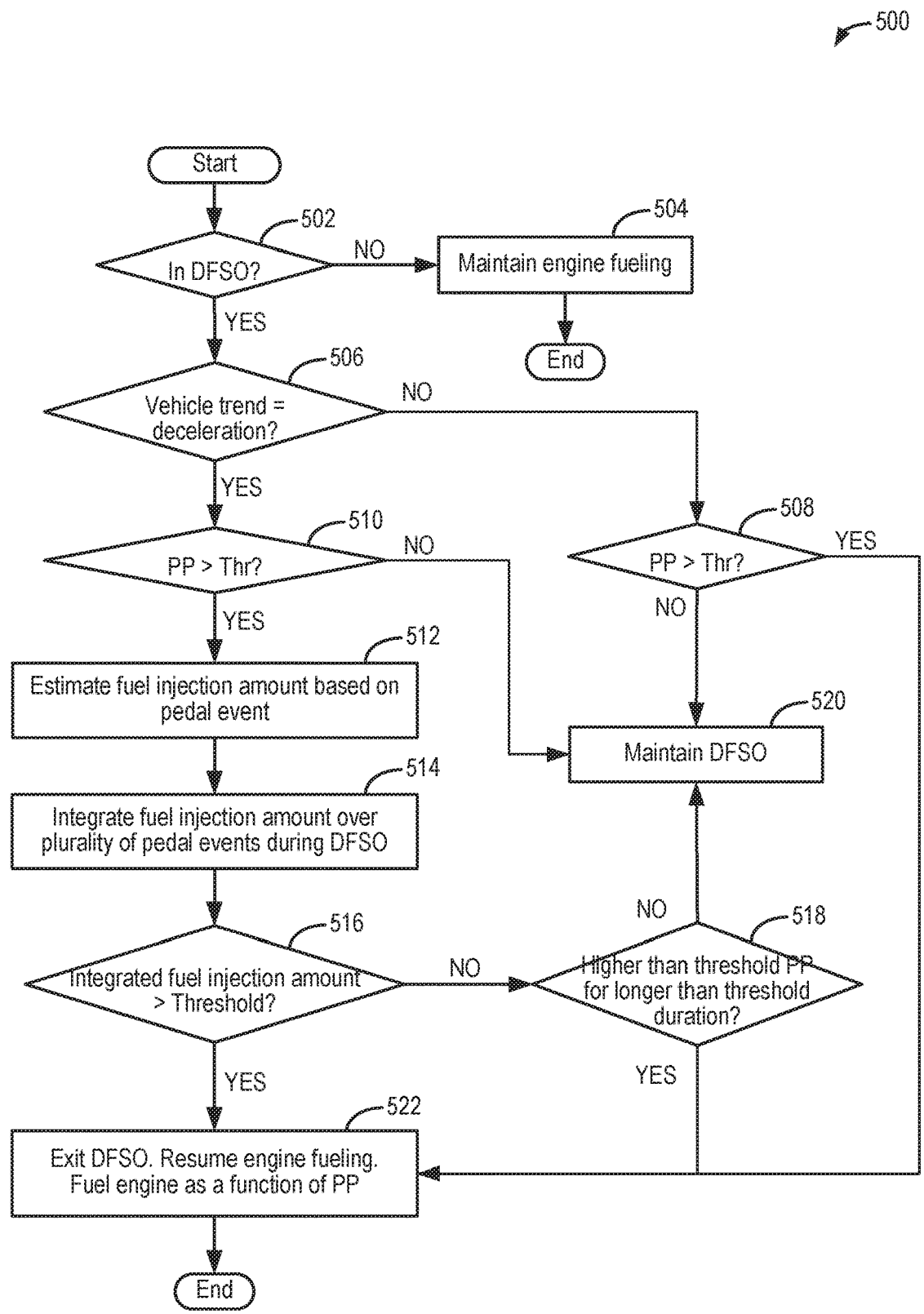
FIG. 5 shows a flow chart of another example method of filtering an operator pedal input before confirming exit from a DFSO mode of engine operation.

Turning now to FIG. 5, another example method of confirming DFSO exit conditions based on filtering of operator pedal input over a DFSO is shown at method 500. In one example, the method of FIG. 5 is incorporated in the method of FIG. 3, such as at 322. Operator pedal displacement may be inferred in the method of FIG. 5 based on input from a sensor coupled to an operator device, such as a pedal position sensor coupled to an accelerator pedal. In one example, the method of FIG. 4 is calibrated as a function of engine speed and load (e.g., air mass and fuel mass into the catalyst), and the method of FIG. 5 is used when the method of FIG. 4 is not available.

At 502, as at 402, the method includes confirming that the engine is operating in a DFSO mode with cylinder fueling disabled and valve operation enabled. If not, engine fueling is maintained.

At 504, the vehicle trajectory may be monitored to determine if the vehicle is trending towards deceleration. The vehicle trajectory may be based on navigational input, vehicle speed sensors, vehicle foot-well cameras, etc. For example, it may be determined if the vehicle speed is decreasing, if the vehicle track includes a decline, if the operator foot is moving away from the accelerator pedal, etc.

If the vehicle trajectory does not indicate a trend towards vehicle deceleration, such as when the vehicle trend is towards maintenance of speed (e.g., cruise control), or vehicle acceleration, then the method moves to 508 to determine if the operator pedal position input is higher than a threshold. Herein, the threshold is a function of the catalyst state, as discussed with reference to FIG. 4. For example, the threshold is adjusted based on catalyst temperature and/or oxygen loading, the threshold decreased as the catalyst temperature decreases (e.g., towards or below a light-off temperature), and/or as the oxygen loading increases (e.g., towards or beyond a saturation level). If the pedal position input is not higher than the threshold, then at 520, the engine is maintained in DFSO with cylinder fueling disabled.

Else, if the pedal position input is higher than the threshold, while the vehicle trend does not include deceleration, the method moves to 522 to exit the DFSO state and resume engine fueling. Thereafter, the controller may fuel engine as a function of the pedal position input (PP), as described earlier with reference to FIG. 4.

If the vehicle trend does include deceleration, then at 510 it may be determined if the pedal position input is higher than the threshold. If not, then the method moves to 520 to maintain DFSO. Else, if the pedal position input is higher than the threshold, then at 512, a fuel injection amount associated with the pedal position input is estimated. For example, as the pedal position is displaced further, the estimated fuel injection amount is increased. As such, one or more pedal events may occur while in DFSO. For example, there may be a pedal event wherein the operator indicates a desired for increase torque. However, the inventors herein have recognized that it may be possible that the operator has a jittery foot which provides multiple transient pedal input without necessarily desiring increased torque. Thus, at 514, for each pedal event while in DFSO, a fuel injection amount may be similarly estimated and integrated (or summed). It will be appreciated that at this time, the fuel injection amounts are estimated and integrated but not delivered.

At 516, the integrated fuel injection amount is compared to a threshold amount. The threshold amount is based on the catalyst state. The time thresholds may be calibrated as a function of the air mass flow rate, and may be empirically calibrated as a function of the air mass to see when the particular catalyst design would get to too high of a temperature. The time thresholds may also depend on catalyst volume, precious metal loading and type, as well as proximity to the exhaust valves.

If the integrated fuel injection amount exceeds the threshold amount, then the method moves to 522 to exit the DFSO state and resume engine fueling. Thereafter, the controller may fuel engine as a function of the pedal position input (PP), as described earlier with reference to FIG. 4.

If the integrated fuel injection amount does not exceed the threshold amount, then at 518, it may be determined if the higher than threshold pedal position input has been maintained for longer than a threshold duration. As discussed with reference to the method of FIG. 4, it may be determined if the operator has maintained the pedal position input or if the operator has a jittery foot. If the input remains elevated for longer than a threshold duration, the method moves to 522 to exit the DFSO and resume fueling. The method then ends. Else, at 520, the DFSO is maintained.

An example timeline of engine operation for a vehicle with DFSO entry and exit in accordance with the method of FIG. 5 is now described with reference to FIG. 7. Map 700 depicts vehicle speed (Vs) at plot 702, operator pedal position (PP, indicative of torque demand) at plot 704, engine fueling at plot 706, output of a timer at plot 708, the position of an intake throttle (electronic throttle control) at plot 710, predicted exhaust catalyst oxygen storage at plot 712, an integrated estimated fuel injection amount at plot 714, and catalyst temperature at plot 716. All plots are shown over time along the x-axis.

Prior to t1, the vehicle is travelling (plot 702) with the engine operating fueled (plot 706). At this time, engine fueling is adjusted as a function of operator accelerator pedal position (plot 704). More specifically, responsive to operator pedal displacement to beyond a threshold pedal position 705, fuel is delivered to the engine. In particular, the intake throttle opening (plot 710) is adjusted as a function of the pedal position, and the engine fueling is adjusted as a function of the air charge ingested via the throttle opening so as to maintain a target air-fuel ratio (such as at or around stoichiometry). Since the DFSO mode is not being operated at this time, the timer (plot 708) is disabled. In addition, the fuel injection amount is not integrated (plot 714). Due to engine fueled operation, the predicted oxygen loading of an exhaust catalyst (plot 712) is relatively low (e.g., below an oxygen loading state threshold).

At t1, responsive to an operator pedal tip-out, and a corresponding drop in torque demand, a DFSO mode is entered by disabling engine fueling. At the same time, cylinder valves are maintained operational so that the engine continues to pump air through the cylinders. As a result of entering the DFSO mode, the vehicle starts to decelerate. In addition, due to the pumping of air through the cylinder valves, a predicted oxygen loading state of the exhaust catalyst starts to rise. Catalyst temperature (shown at plot 716) starts to decrease.

Also responsive to the DFSO mode, a timer is enabled. However, time is not counted up on the timer until a pedal event occurs while in the DFSO mode. Between t1 and t2, there is no operator pedal event. Further, responsive to the DFSO mode being entered, threshold pedal position 705 is raised relative to the threshold level in the non-DFSO mode prior to t1. In one example, the threshold pedal position is raised from a default non-DFSO mode value to a default DFSO mode value. For example, the DFSO mode threshold position may be 5% higher than the default non-DFSO mode threshold position. In an alternate example, the DFSO mode threshold position may be raised relative to the non-DFSO mode threshold position as a function of time elapsed in DFSO mode, a number of tip-ins that have occurred since the DFSO was initiated, and/or a number of times DFSO has been reactivated (that is, based on twitch pedal or jittery foot).

At t2, there is a transient pedal event. In particular, the transient operator pedal event includes a displacement of the accelerator pedal to higher than the threshold pedal position 705. Responsive to the pedal displacement being higher than the threshold position, the timer commences to count time for a duration for which the pedal remains depressed beyond the threshold position. When the pedal is released, the timer stops counting. Herein, the pedal remains at the higher than threshold position for a duration that is smaller than threshold duration 707. Also, the controller estimates an amount of fuel that is injected based on the transient pedal event (plot 714). Due to the small displacement, the amount of fuel required is less than a threshold fuel amount 713. Herein, the pedal event may have been due to an operator's jittery foot, rather than an actual demand for increased torque. However, because catalyst temperature is below a threshold temperature 715, the tip-in is honored and the throttle is opened and fuel is injected. Due to the fuel injection, oxygen is consumed with the fuel and hence the predicted catalyst oxygen amount decreases and catalyst temperature rises.

At t3, there is another transient pedal event. This transient operator pedal event includes a displacement of the accelerator pedal to higher than threshold pedal position 707. Responsive to the higher than threshold pedal event, the timer starts to count a duration for which the pedal remains depressed beyond the threshold position. When the pedal is released, the timer stops counting. Herein the pedal remains at the higher than threshold position for a duration that is smaller than threshold duration 707. The controller also estimates a fuel injection amount that is/will be injected for the pedal event at t3 and integrates the fuel injection amount (or adds it) to the earlier injection amount determined at t2. That is, a sum of the total injection amount from pedal events at t2 and t3 is determined. However, the sum remains below threshold fuel amount 713. Accordingly, it may be inferred that the pedal event is transient, such as due to an operator's jittery foot, and not due to an actual demand for increased torque. Again, because catalyst temperature is below the threshold temperature 715, fuel is injected and the throttle is opened in response to the tip-in at time t3. Due to the fuel injection, oxygen is consumed with the fuel and hence the predicted catalyst oxygen amount decreases and catalyst temperature rises.

At t4, there is yet another pedal event. This operator pedal event includes a displacement of the accelerator pedal to higher than threshold pedal position 707. Responsive to the higher than threshold pedal event, the timer starts to count a duration for which the pedal remains depressed beyond the threshold position. When the pedal is released, the timer stops counting. Herein the pedal remains at the higher than threshold position for a longer duration than the event at t3, but the duration is nonetheless smaller than the threshold duration 707. The controller also estimates the fuel injection amount for the transient pedal event and integrates with the values from the earlier events. The integrated fuel injection amount now exceeds the threshold fuel amount 713. The predicted catalyst oxygen goes down as the oxygen is consumed with the fuel and hence catalyst temperature rises and exceeds the threshold temperature 715 (though the catalyst temperature is not at a maximum temperature 717, leaving a margin to the highest allowed temperature).

From t1 through t5, the threshold pedal position 705 gradually increases. As explained above, the threshold pedal position may increase over time as a function of time, number of tip-in events, and so forth. Further, from t1 through t5, vehicle speed steadily decreases as the vehicle is in a long deceleration event. However, with each tip-in that is honored (e.g., the tip-ins at t2, t3, and t4), vehicle speed transiently increases due to the transient throttle opening and fuel injection.

At t5, there is still another pedal event. This operator pedal event includes a displacement of the accelerator pedal to just below the threshold pedal position 705, which also increases at t5 (e.g., by 5% and due to the catalyst temperature exceeding the threshold temperature). The timer counts the duration of the tip-in, which is relatively short (e.g., compared to the prior tip-ins) and does not exceed the threshold time 707. As such, due to the pedal position being below the threshold pedal position, the short duration of the timer, the integrated fuel amount above the threshold 713, and/or the high catalyst temperature, the vehicle remains in DFSO and the throttle remains in the more-closed position and fuel is not delivered at t5, despite the operator tip-in. The integrated fuel amount resets at t5. Further, due to the lack of fuel injection while intake air is pumped through the engine, predicted catalyst oxygen continues to increase and catalyst temperature decreases (or at least does not increase).

At t6, another tip-in event occurs. The pedal position during the tip-in event at t6 exceeds the threshold pedal position 705, and the timer (started once the tip-in was detected) exceeds the threshold 707. Thus, the vehicle exits out of DFSO, and the throttle is controlled based on the pedal position and fuel is delivered in proportion to the throttle position. During the initial portion of the tip-in (e.g., while the timer is counting), the fuel may be integrated (as shown by plot 714 immediately after t6), but the integration of the fuel may reset and cease when the timer stops counting. Because of the normal, fueled operation, the predicted catalyst oxygen amount and the catalyst temperature both decrease. At t7, due the catalyst temperature decreasing and the resetting of the fuel integration, the threshold pedal position 705 may decrease back to the threshold pedal position prior to t1.

In this way, transient pedal inputs received during a DFSO due to a jittery operator foot may be filtered out to reduce catalyst degradation under some conditions. In the example shown in FIG. 7, the intent is to honor the tip ins until the catalyst temperature comes close to the maximum catalyst temperature (e.g., exceeds the temperature threshold), then stay in DFSO until the pedal demand is high enough or long enough to determine the tip-in is not just jitter but actual torque demand increasing. By delaying an exit out of DFSO, including a resuming of engine fueling, until operator pedal input is sustained for a duration of the DFSO, misfires and partial burns occurring due to excess fuel being delivered to an exhaust catalyst are averted. By adjusting the filtering of pedal inputs received during the DFSO, an actual request for increased torque can be better distinguished from unintended operator pedal activity, reducing the occurrence of a premature exit from a DFSO. By prolonging the DFSO, fuel economy is improved. By limiting low load fuel flow, the exhaust catalyst can be better protected from thermal degradation, extending catalyst life.

One example method comprises: while operating an engine with fuel disabled and air being pumped through cylinder valves, filtering operator pedal input with a different filter parameter relative to filtering during fueled engine operation; and resuming engine fueling based on the filtered operator pedal input. In the preceding example, additionally or optionally, the filtering includes maintaining engine fueling disabled until the operator pedal input remains higher than a threshold input for longer than a threshold duration. In any or all of the preceding examples, additionally or optionally, one or more of the threshold input and the threshold duration is based on a state of an exhaust catalyst coupled to an exhaust passage of the engine. In any or all of the preceding examples, additionally or optionally, based on the state of the exhaust catalyst includes based on a temperature and/or an oxygen loading of the catalyst. In any or all of the preceding examples, additionally or optionally, the threshold input is lowered as the temperature of the exhaust catalyst decreases below an activation temperature or the oxygen loading of the catalyst increases above a saturation level. In any or all of the preceding examples, additionally or optionally, the threshold duration is decreased as the temperature of the exhaust catalyst decreases below an activation temperature or the oxygen loading of the catalyst increases above a saturation level. In any or all of the preceding examples, additionally or optionally, the temperature is a predicted drop in temperature of the catalyst inferred based on air mass. In any or all of the preceding examples, additionally or optionally, the filtering includes: estimating a fuel injection amount for the operator pedal input; integrating the estimated fuel injection amount over a plurality of operator pedals inputs received while operating the engine with fuel disabled; maintaining engine fueling disabled until the integrated fuel injection amount exceeds a threshold, the threshold based on a temperature and/or an oxygen saturation of an exhaust catalyst coupled to an exhaust passage of the engine; and then resuming fueled engine operation. In any or all of the preceding examples, additionally or optionally, the engine is coupled in a vehicle, and wherein the estimating the fuel injection amount is responsive to the vehicle decelerating while the engine is operated with fuel disabled and air being pumped through cylinder valves. In any or all of the preceding examples, additionally or optionally, maintaining the engine fueling disabled includes maintaining an intake throttle at an idling position until the operator pedal input remains higher than the threshold input for longer than the threshold duration, then increasing an opening of the intake throttle based on the operator pedal input, and fueling the engine based on the increased throttle opening to provide a target combustion air-fuel ratio.

Another example method comprises: while operating an engine fueled, increasing engine fueling as a function of operator pedal input responsive to a first operator pedal input being higher than a threshold for a first duration; and while operating an engine unfueled and air being pumped through cylinder valves, resuming engine fueling as a function of the operator pedal input responsive to a second operator pedal input being higher than the threshold for a second duration, longer than the first duration. In any or all of the preceding examples, additionally or optionally, the first operator pedal input is higher than a first threshold, and the second operator pedal is higher than a second threshold, the second threshold larger than the first threshold. In any or all of the preceding examples, additionally or optionally, a position of an intake throttle is continually adjusted as a function of the first operator pedal input when the engine is operating fueled, and when the engine is operated unfueled, the position of the intake throttle is maintained at an idling position until the second operator pedal input is higher than the threshold for the second duration. In any or all of the preceding examples, additionally or optionally, the method further comprises adjusting each of the threshold and the second duration as a function of exhaust catalyst temperature and/or catalyst oxygen saturation, the threshold raised and the second duration increased as the catalyst temperature increases and/or the catalyst oxygen saturation decreases. In any or all of the preceding examples, additionally or optionally, the method further comprises estimating the exhaust catalyst temperature and/or the catalyst oxygen saturation as a function of duration of unfueled engine operation, the catalyst temperature lowered and/or the oxygen saturation increased as the duration of unfueled engine operating increases.

Another example system for a vehicle comprises: an engine with an intake, an exhaust, and cylinders having selectively deactivatable fuel injectors and cylinder valves; a position sensor coupled to an operator pedal for estimating operator torque demand; a throttle coupled to the engine intake; an exhaust catalyst coupled to the engine exhaust; and a controller with computer readable instructions stored on non-transitory memory for: responsive to a decrease in the operator torque demand, deactivating cylinder fuel injectors to disable engine fueling while continuing to pump air through cylinder valves and while holding the throttle at an idling position; maintaining the throttle at the idling position and the engine fueling disabled responsive to a higher than threshold operator torque demand sustained for a first duration; and increasing throttle opening and resuming engine fueling responsive to the higher than threshold operator torque demand sustained for a second duration, longer than the first duration. In any or all of the preceding examples, additionally or optionally, the second duration is increased relative to the first duration as a function of estimated catalyst temperature. In any or all of the preceding examples, additionally or optionally, the controller includes further instructions for estimating a fuel amount to be injected for each of a plurality of operator pedal inputs received while operating the engine with fueling disabled, each of the plurality of pedal inputs including an increase in torque demand; and maintaining the throttle at the idling position and the engine fueling disabled until a sum of the estimated fuel amount exceeds a threshold amount, the threshold amount based on a temperature and/or an oxygen loading level of the exhaust catalyst. In any or all of the preceding examples, additionally or optionally, after the estimated fuel amount exceeds the threshold input, responsive to a further operator pedal input, increasing an opening of the throttle based on the increase in torque demand associated with the further operator pedal input, and increasing engine fueling based on the increased throttle opening to operate the engine at or around stoichiometry. In any or all of the preceding examples, additionally or optionally, the threshold amount is lowered as the exhaust catalyst temperature falls below an activation temperature, or as the exhaust oxygen loading level exceeds a saturation level.

In another representation, the vehicle is a hybrid vehicle or an autonomous vehicle.

In a further representation, a method for an engine includes, filtering operator pedal input received during engine operation in a DFSO mode to distinguish a transient pedal input from a sustained pedal input; increasing intake throttle opening and resuming engine fueling responsive to the sustained pedal input, and maintaining intake throttle position and fueling disabled responsive to the transient pedal input. In the preceding example, additionally or optionally, the engine operation in the DFSO mode includes low load engine operation with engine fueling disabled and air being pumped through open cylinder valves.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   while operating an engine fueled, increasing engine fueling as a function of operator pedal input responsive to a first operator pedal input displacement being higher than a first threshold for a first duration;
   while operating the engine unfueled and air being pumped through cylinder valves, resuming engine fueling as a function of the operator pedal input responsive to a second operator pedal input displacement being higher than a second threshold for a second duration,
   wherein resuming the engine fueling as the function of the operator pedal input includes filtering the operator pedal input with a different filter parameter relative to filtering during fueled engine operation, and resuming engine fueling based on the filtered operator pedal input,
   wherein the second duration is longer than the first duration, and
   wherein the second threshold is a larger pedal displacement than the first threshold.

2. The method of claim 1, wherein the filtering includes maintaining engine fueling disabled until the operator pedal input remains higher than the second threshold for longer than the second duration.

3. The method of claim 2, wherein one or more of the second threshold and the second duration is based on a state of an exhaust catalyst coupled to an exhaust passage of the engine.

4. The method of claim 3, wherein based on the state of the exhaust catalyst includes based on a temperature and/or an oxygen loading of the catalyst.

5. The method of claim 4, wherein the second threshold is lowered as the temperature of the exhaust catalyst decreases below an activation temperature or the oxygen loading of the catalyst increases above a saturation level.

6. The method of claim 4, wherein the second duration is decreased as the temperature of the exhaust catalyst decreases below an activation temperature or the oxygen loading of the catalyst increases above a saturation level.

7. The method of claim 4, wherein the temperature is a predicted drop in temperature of the catalyst inferred based on air mass.

8. The method of claim 2, wherein the filtering includes:
   estimating a fuel injection amount for the operator pedal input;
   integrating the estimated fuel injection amount over a plurality of operator pedal inputs received while operating the engine with fuel disabled;
   maintaining engine fueling disabled until the integrated fuel injection amount exceeds a threshold, the threshold based on a temperature and/or an oxygen saturation of an exhaust catalyst coupled to an exhaust passage of the engine; and
   then resuming fueled engine operation.

9. The method of claim 2, wherein the engine is coupled in a vehicle, and wherein the estimating the fuel injection amount is responsive to the vehicle decelerating while the engine is operated with fuel disabled and air being pumped through cylinder valves.

10. The method of claim 2, wherein maintaining the engine fueling disabled includes maintaining an intake throttle at an idling position until the operator pedal input remains higher than the threshold input for longer than the threshold duration, then increasing an opening of the intake throttle based on the operator pedal input, and fueling the engine based on the increased throttle opening to provide a target combustion air-fuel ratio.

11. A method, comprising:
   while operating an engine fueled, increasing engine fueling as a function of operator pedal input responsive to a first operator pedal input displacement being higher than a first threshold for a first duration; and
   while operating an engine unfueled and air being pumped through cylinder valves, resuming engine fueling as a function of the operator pedal input responsive to a second operator pedal input displacement being higher than a second threshold for a second duration,
   wherein the second duration is longer than the first duration, and wherein the second threshold is a larger pedal displacement than the first threshold.

12. The method of claim 11, wherein a position of an intake throttle is continually adjusted as a function of the first operator pedal input when the engine is operating fueled, and when the engine is operated unfueled, the position of the intake throttle is maintained at an idling position until the second operator pedal input is higher than the threshold for the second duration.

13. The method of claim 11, further comprising, adjusting each of the threshold and the second duration as a function of one or more of exhaust catalyst temperature and catalyst oxygen saturation, where the threshold is raised and the second duration is increased as one or more of the catalyst temperature increases and the catalyst oxygen saturation decreases.

14. The method of claim 13, further comprising, estimating one or more of the exhaust catalyst temperature and the catalyst oxygen saturation as a function of duration of unfueled engine operation, where one or more of the catalyst temperature lowered and the oxygen saturation is increased as the duration of unfueled engine operating increases.

15. The method of claim 11, wherein the second duration is increased relative to the first duration as a function of estimated catalyst temperature.

16. The method of claim 11, further comprising:
   before receiving the second operator pedal input displacement and resuming the engine fueling,
      estimating a fuel amount to be injected for each of a plurality of operator pedal inputs received while operating the engine unfueled and the air being pumped through the cylinder valves, each of the plurality of pedal inputs including an increase in torque demand; and
      maintaining a throttle of the engine at an idling position and maintaining the engine unfueled until a sum of the estimated fuel amount exceeds a threshold amount, the threshold amount based on a temperature and/or an oxygen loading level of an exhaust catalyst of the engine.

17. The method of claim 16, further comprising increasing an opening of the throttle based on the second operator pedal input displacement, and wherein resuming the engine fueling includes increasing engine fueling based on the increased throttle opening to operate the engine at or around stoichiometry.

18. The method of claim 16, wherein the threshold amount is lowered as the exhaust catalyst temperature falls below an activation temperature, or as the exhaust oxygen loading level exceeds a saturation level.

19. A method, comprising:
   while operating an engine fueled, increasing engine fueling as a function of operator pedal input responsive to a first operator pedal input displacement being higher than a threshold for a first duration;
   while operating an engine unfueled and air being pumped through cylinder valves, resuming engine fueling as a function of the operator pedal input responsive to a second operator pedal input displacement being higher than the threshold for a second duration, wherein the second duration is longer than the first duration; and
   adjusting each of the threshold and the second duration as a function of one or more of exhaust catalyst temperature and catalyst oxygen saturation, where the threshold is raised and the second duration is increased as one or more of the catalyst temperature increases and the catalyst oxygen saturation decreases.

20. The method of claim 19, further comprising, estimating one or more of the exhaust catalyst temperature and the catalyst oxygen saturation as a function of duration of unfueled engine operation, where one or more of the catalyst temperature lowered and the oxygen saturation is increased as the duration of unfueled engine operating increases.

* * * * *